March 7, 1939. S. H. PELLAR 2,149,927
MATERIAL-TREATING MACHINE
Filed Jan. 16, 1937 2 Sheets-Sheet 1

Inventor:
Sidney H. Pellar
By: Stevens & Batchelor
Atty's.

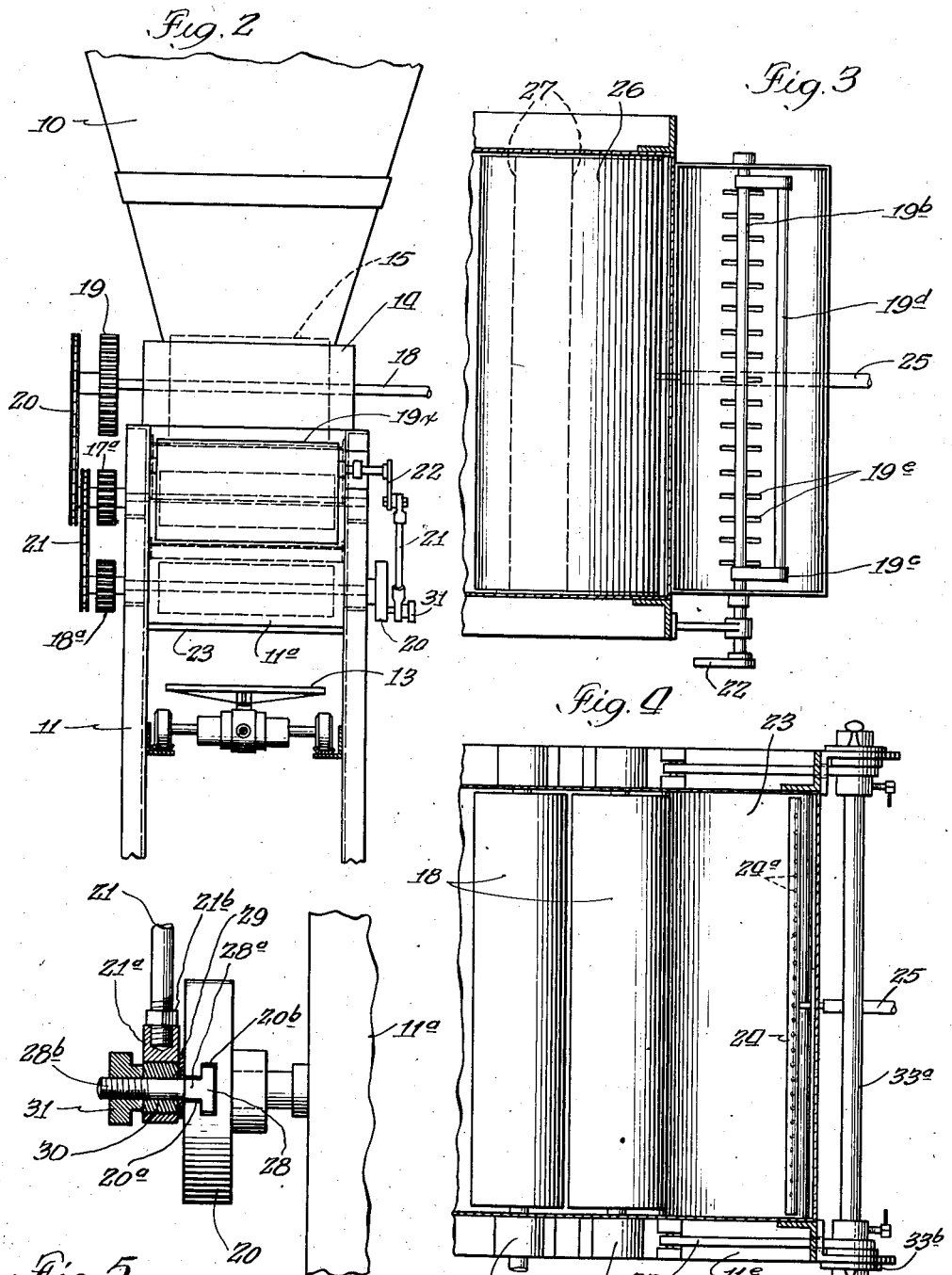

Patented Mar. 7, 1939

2,149,927

UNITED STATES PATENT OFFICE 2,149,927

MATERIAL-TREATING MACHINE

Sidney H. Pellar, Chicago, Ill.

Application January 16, 1937, Serial No. 121,005

5 Claims. (Cl. 107—12)

My invention relates to machines for treating dough and other plastic materials for the bakery and confectionery trade, and more particularly to devices for forming and conditioning the material preliminary to its adaptation to the goods required, and my main object is to provide a machine in the nature of a compact unit to treat the material as contemplated.

A further object of my invention is to provide a machine which fashions the dough or like material from the mass into ribbon or sheet form, whereby to be suitable for the production of pie-crusts, cookies, biscuits, crackers, candy chips or foundations, wafers, etc.

A still further object of the invention is to incorporate in the novel machine means for progressively changing the dough or like material from a relatively-thick form to sheets reduced in thickness and to result in sheets so thin as to be suitable for the bakery or confectionery varieties mentioned above.

Another object of the invention is to incorporate in the novel machine means for dusting or powdering the dough or material sheet on both sides as it passes through the machine in order that it may issue therefrom in non-adhesive form.

An additional object of the invention is to design the novel machine with means to co-ordinate its action with a traveling medium adapted to receive the issuing material sheet for further treatment.

An important object of the invention is to construct the novel machine along lines of simplicity, efficiency, and durability.

With the above objects in view, and any others which may suggest themselves from the description to follow, a better understanding of the invention may be had by reference to the accompanying drawings in which—

Fig. 2 is an end view thereof from the left hand side of Fig. 1, on a reduced scale;

Figure 1:
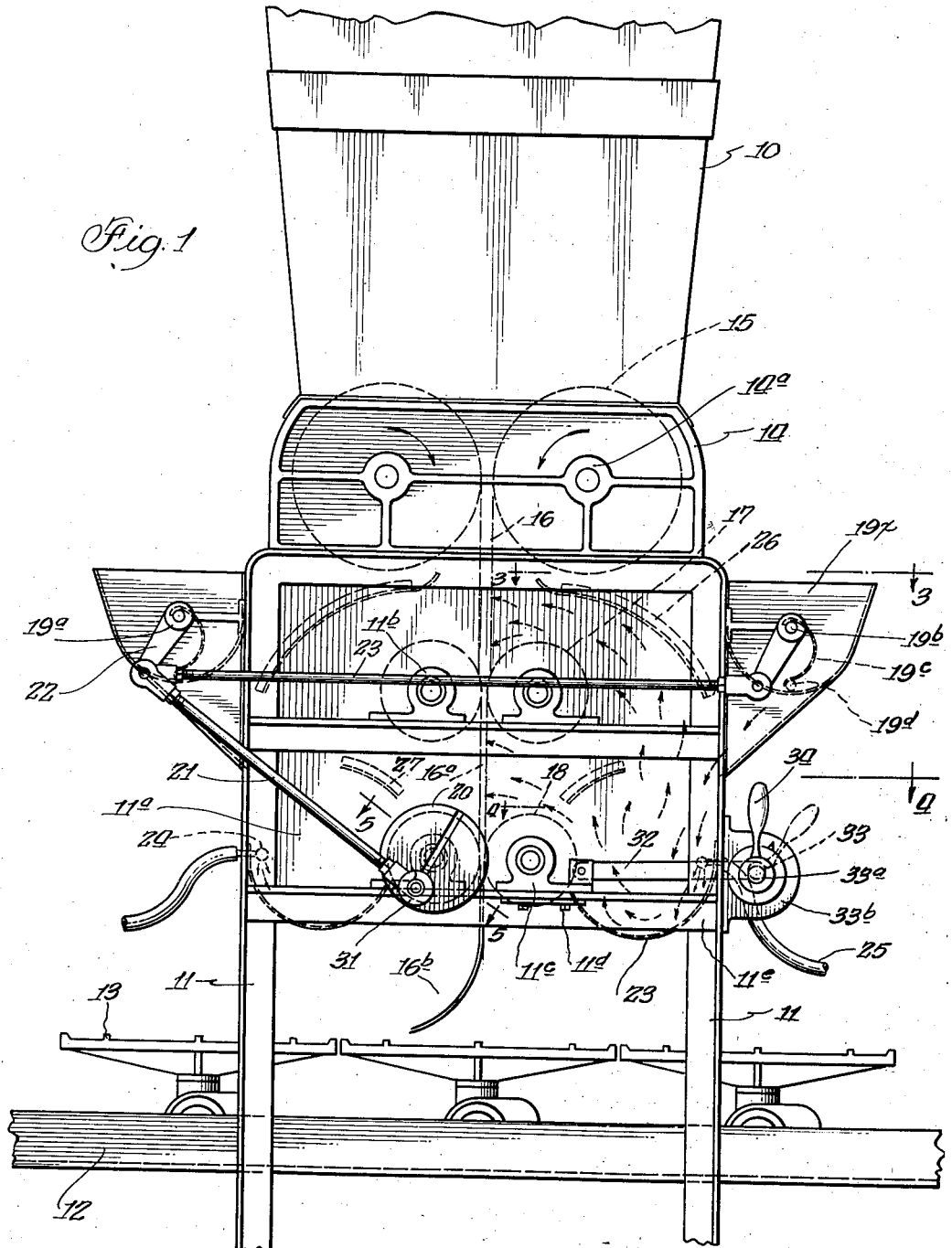
Fig. 1 is a front elevation of the novel machine.

Figs. 3 and 4 are respectively, sections taken on the lines 3—3 and 4—4 of Fig. 1; and Fig. 5 is a detailed section, on an enlarged scale, on the lines 5—5 of Fig. 1.

In the formation of sheet or ribbon material, such as dough, taffy, caramel, or the like, the sheets are usually made by hand and rolled down to the required thickness. In order that they may be properly prepared, they must be picked up and passed through various rollers one at a time and then laid where they may be cut, shaped, or otherwise treated for the eventual purpose or product. It is apparent that a process of this kind not only consumes considerable time and labor, but subjects the material to contamination with dust or other foreign matter. Also, the handling of the material tends to bring about an unsanitary condition, so that it is far from pure when it enters into the product. It has been my intention to depart from the above deficiencies by providing a machine which forms and powders the dough sheet without human aid or contact, so that the sheet issues in proper form and condition for further treatment.

In accordance with the foregoing, specific reference to the drawings indicates a hopper at 10, which is built on a four-legged stand 11. The hopper 10 is adapted to be loaded with the dough, caramel, or other material from which the sheet is to be formed; and between the legs of the stand 11 is located a conveyor 12 having longitudinally-traveling supports 13 acting in the manner of a belt to receive the material sheet from the bottom of the machine.

The bottom of the hopper 10 opens into a box 14 forming the head portion of a housing 11a constructed in the upper portion of the stand 11. The box 14 is provided with laterally-spaced bearings 14a for journaling a pair of rollers 15 having a comparatively wide space between them to receive the material from the hopper. With the rollers 15 turning together in the direction of the arrows shown in the upper part of Fig. 1, it will be evident that the material mass will be fashioned into a thick sheet 16. The housing 11a also carries bearings 11b for a second set of rollers 17 which are smaller and more closely spaced than the previous ones, so that the sheet 16 is first thinned down to the thickness indicated at 16a and finally to that indicated at 16b, the sheet now being of the requisite final thickness and led in a direction to be deposited in containers or forms carried by the conveyor supports 13. As it is not the province of the present application to cover the application and treatment of the material sheet, it is not necessary to describe its progress after issuing from the present machine. Suffice it to say that the travel of the conveyor will be regulated to take the material as fed from the bottom of the machine. This feed is preferably controlled by a shaft 18 leading from the power source which operates the conveyor, such shaft operating one of the rollers 15 and carrying a gear 19. The corresponding rollers 17 and 18 are connected with the shaft 18 by chain drives 20 and 21, the shaft of the roller 17 carrying a gear 17a and that of the roller 18 carrying a gear 18a. Thus, one vertical set of rollers is co-operatively connected; and companion gears (not shown) meshed with the gears 19, 17a and 18a and carried by the companion rollers serve to operate these in harmony with their mates. Needless to say, the gear ratio between the three vertically-spaced sets of rollers will be so calculated as to both conform with the travel of the conveyor and impart the proper treatment to the material, as it descends through the machine.

As previously mentioned, it is necessary that the surfaces of the plastic material be dusted or powdered with a dry substance in order that the material sheet may not adhere to the parts with which it comes in contact during further treatment. In the case of dough, it is customary to dust the sheet with flour, while in the case of confections powdered sugar is usually employed. For use in the present machine, containers 19x are attached to the ends of the housing 11a and filled with the powdered substance. Primarily, it is necessary to agitate and feed the powder from the containers into the housing. This is done by mounting a disc 20 on the front end of the shaft carrying one of the rollers 18, the disc serving in the manner of a crank to impart a reciprocatory motion to a rod 21. Each of the containers 19x has a frontal bearing 19a for a crank 22, both of these cranks being joined by a horizontal bar 23. The rod 21 is linked to one of the cranks 22 and therefore procures the oscillation of the cranks 22 in unison. Inside each container the crank shaft 19b carries a pair of spring bows 19c near its ends, these extending to points near the bottom of the container and being joined by a long rod 19d thereat. Each container has its bottom cut with a series of cross-slots 19e, and as the rod 19d is carried forth and back along the bottom of the container it serves to both agitate its contents and sweep them through the slots 19d, whereby to issue into the housing 11a in a series of sprays or jets.

In entering the housing 11a, the series of powder sprays descends into a pair of troughs 23 of curved formation. Within the outer rims of these are horizontal tubes 24 which have longitudinal rows of bottom perforations 24a. Each tube 24 receives from an external source a continuous supply of compressed-air by way of a hose 25. The air jets directed downwardly from the tubes 24 impart a cyclonic action to the joint sprays descending into the troughs 23 with the effect of swirling them in an upward direction. In rising toward the top of the housing 11a, the powder currents meet dome-like members 26 which deflect them toward the center to strike and coat the sides of the material sheet 16. These currents have a tendency by their inward swirl in the troughs 23 to strike and coat the lower portion 16a of the material sheet, but excessive action in this direction is avoided by providing a pair of baffles 27 in the path of these currents, such baffles training them in an outward direction to rise toward the deflectors 26. Thus, the concerted action of the powder supply units 19x, the air feed units 25 and the structural formations 23, 26, and 27 procure a uniform and thorough application of the powder to the faces of the material sheet, so that the same issues in dry form from the bottom of the machine.

It is necessary that the action of the power feed from the containers 19x be regulated for proper results, and this is done by providing an adjustment of the crank motion to the rod 21 as indicated in Figs. 1 and 5. It is seen in these illustrations that the disc 20 is formed with a facial diametrical slot 20a which is enlarged on the inside as indicated at 20b to slidably seat a T-block 28 whose shank 28a is in the form of a bolt and threaded along its outer portion as indicated at 28b. The shank receives a washer 29 next outside the disc, then a sleeve 30, and finally a nut 31. On the sleeve is linked a head-piece 21a forming the lower portion of the rod 21. When the nut 31 is loosened, the T-block 28 may be shifted in its slot to any radial distance in the disc corresponding with the speed required for the agitation and feed in the containers 19x, the adjustment being then fixed by re-tightening the nut 31. This adjustment has no effect on the freedom of the head-piece 21a to change its angle during the crank motion. Incidentally, it is seen in Fig. 5 that the length of the rod 21 is also adjustable by means of a lock nut 21b relative to the head piece, such expedient being repeated at the opposite end of the rod and at the ends of the bar 23.

It may be necessary to regulate the final thickness of the material sheet and I choose to do this by shifting the right-hand roller 18 as seen in Fig. 1 to the right or left. For this purpose, I cause the bearings 11c of this roller to be slidable and adjustable by means of bolts 11d to a cross-member 11e of the stand 11. The adjustment is procured by links 32 connected to the bearings as shown and extending outwardly to eccentrics 33 of a shaft 33a carried by bearings 33b at one end of the housing 11a, each end of the shaft 33a having an operating handle 34. Fig. 1 shows the handle shifted to the dotted line position when the related roller 18 is moved in the corresponding direction.

It is evident from the above description that the material treated in the novel machine is fully encased and protected from dust or foreign matter throughout its entire course in the machine. Further, it is thinned down and properly powdered without being touch by human hands so that it issues in uniform and santiary condition. The uniformity of the sheet is further assured by the fact that it passes through the three sets of rollers in a downward direction, whereby to maintain a straight course by gravity and require no supports whatever during passage from one set of rollers to another, as might be necessary in case the material took a horizontal or inclined course. It is further evident that the manner in which the progressive thinning elements are grouped in the machine makes the mechanism compact, the action direct, and the course of the material through the machine as short as possible when allowance is made for the portions that must be exposed to the dusting or powdering actions. Further, the powder is not only fed uniformly across the machine so as to be directed evenly, but it is continually agitated in its reservoirs or containers in order not to pack or settle along the courses of its passage. The connections for operating the powder feed are few and lead from a single source. Also, the rollers instead of being plain may be formed with a series of annular grooves to form and feed the material in ribbon form, and the grooves may be divided with forms suitable to create units of any desired character or form in the ribbons. Finally, the machine is of a self-contained nature, whereby to be manufactured as a unit and easily connected to the mechanism or other machinery with which it is to co-operate.

I claim:

1. In a material treating machine comprising a housing having means to feed a sheet of plastic material downwardly through the same, means to powder the surfaces of said material and including containers outside the ends of the housing for the powdered substance, rock shafts in the containers, cranks carried by one of the ends of the rock shafts, a cross bar linking the cranks for joint motion, an element imparting oscillating motion to the cranks, a sweep member carried by each rock shaft and operable along the bottom of the related container, the latter having perforations for the passage of the powdered substance into the housing from the agitation of the sweep member, and other means to direct the substance falling into the housing against the sides of the material sheets.

2. In a material treating machine comprising a housing through which the material passes downwardly in sheet form, means to supply a powdered substance into the housing from opposite sides of the material and in the form of sprays in a series, and pressure means applied to direct the substance against the faces of the material, said pressure means comprising compressed air units in the ends of the housing below the inlet zone of the powdered substance and operative to force the substance toward the material sheets.

3. The structure of claim 1, said powdering means comprising compressed air inlets into the ends of the housing at a point below the inlet zone of the powdered substance, a transverse tube receiving the compressed air and having a longitudinal series of bottom perforations to direct the compressed air downwardly in the form of jets, and curved bottom sections of the housing effective to impart a cyclonic action to the substance as moved by the compressed air jets with the effect of directing such substance toward the material sheet.

4. The structure of claim 1, and baffles in the inward path of the substance and deflecting the same in outward and upward directions.

5. The structure of claim 1, baffles in the inward path of the substance and deflecting the same in outward and upward directions, and dome-like deflectors in the upper corners of the housing ends and effective to train the rising currents of the substance in the direction of the material sheet.

SIDNEY H. PELLAR.